UNITED STATES PATENT OFFICE.

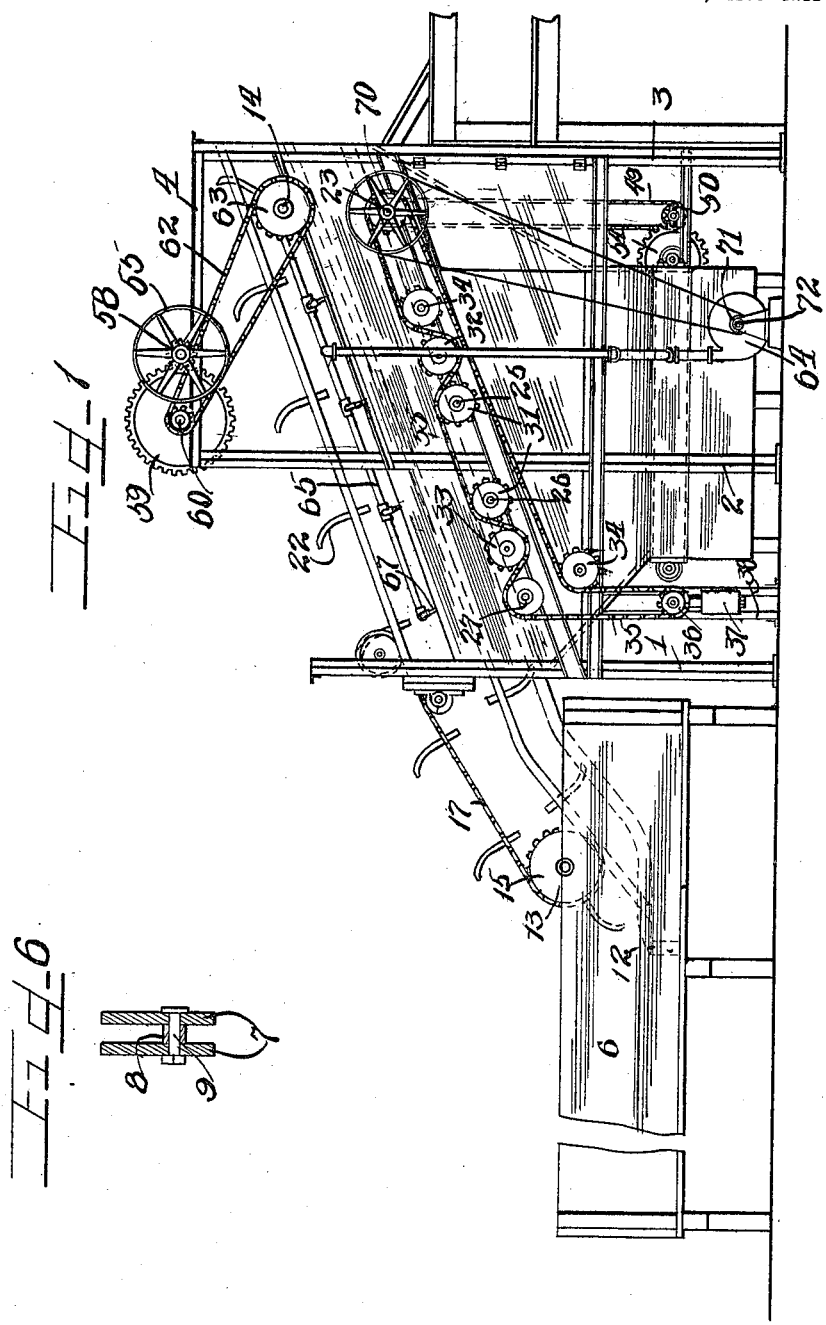

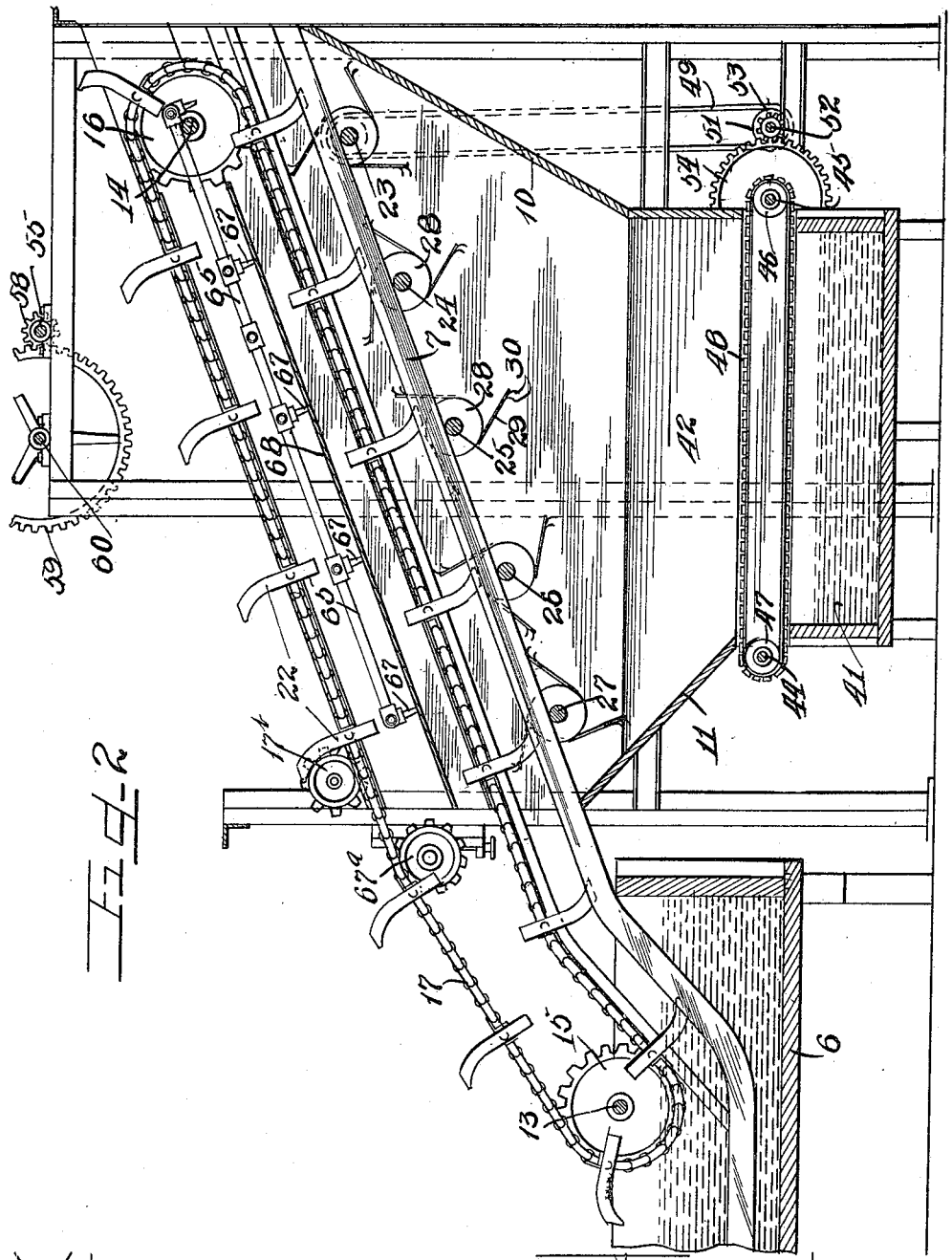

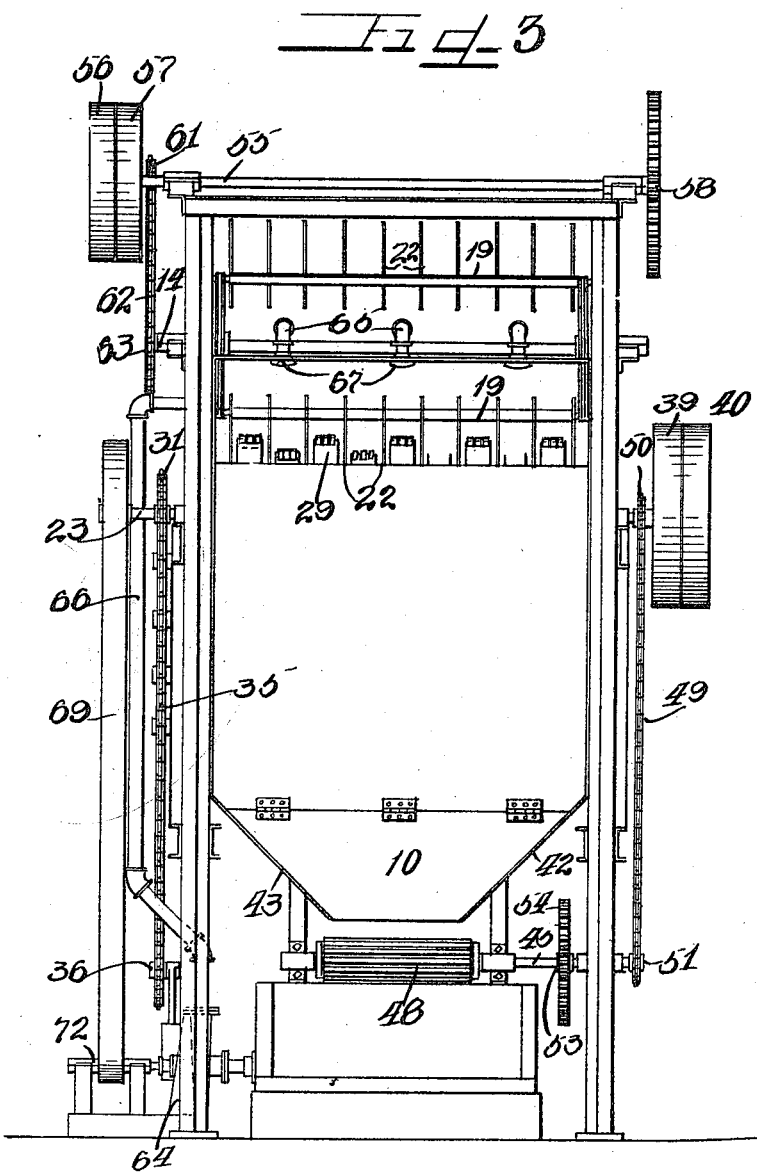

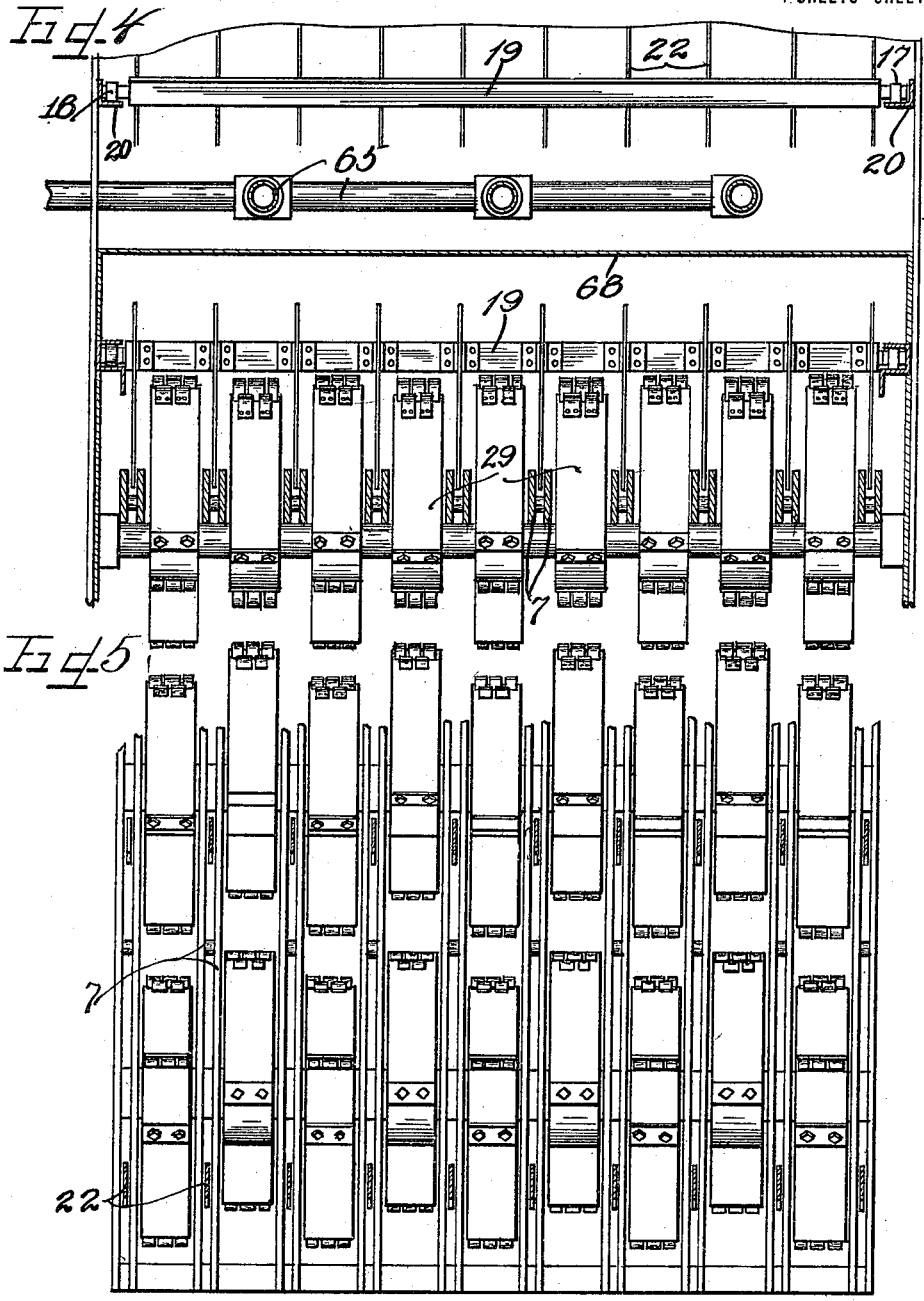

ARTHUR E. OZOUF, OF CHICAGO, ILLINOIS, ASSIGNOR TO ALLBRIGHT-NELL COMPANY, A CORPORATION OF ILLINOIS.

CARCASS DEHAIRING AND CLEANING MACHINE.

1,322,607.　　　　　Specification of Letters Patent.　　Patented Nov. 25, 1919.

Application filed August 13, 1917.　Serial No. 185,897.

*To all whom it may concern:*

Be it known that I, ARTHUR E. OZOUF, a citizen of the United States, and a resident of the city of Chicago, in the county of Cook and State of Illinois, have invented certain new and useful Improvements in Carcass Dehairing and Cleaning Machines; and I do hereby declare that the following is a full, clear, and exact description of the same, reference being had to the accompanying drawings, and to the numerals of reference marked thereon, which form a part of this specification.

This invention relates to improvements in carcass dehairing and cleaning machines.

It is an object of this invention to provide a machine of the class specified in which the carcasses are continuously advanced over a stationary inclined support and in which the scraping mechanism act upwardly through the support to continuously rotate, dehair and clean the carcasses while they are being positively advanced.

It is further an object of this invention to provide a hog scraper in which the carcasses are supported on a stationary slotted support and mechanisms for acting on the carcasses through the support to thoroughly dehair and clean the same.

It is further an object of this invention to provide a stationary supporting mechanism for carcasses and movable conveying mechanism, and a scraping mechanism acting upwardly on the carcasses from below and acting through the support and conveyer.

It is further an object of this invention to provide an inclined stationary support extending into the scalding vat and a mechanism for engaging carcasses and advancing them over the stationary support into position to be operated upon by a scraping mechanism positioned beneath the support and conveyer.

It is further an object of this invention to provide a hog scraping machine in which the scraping mechanisms act upwardly against the gravity of the carcasses and in which the surface of the carcasses presented to the scraping mechanisms is in substantially the same plane thereby overcoming the objection that different parts of the carcasses are treated to a different extent.

It is further an object of this invention to provide a hog scraping machine in which the carcasses are so supported and the scraping mechanism so disposed that all parts of the carcasses are acted upon with equal force and efficiency to thoroughly clean the same.

It is further an object of this invention to provide a machine of the class specified in which the refuse falls by gravity from the machine and is conveyed to one side of the machine and in which means are provided for continuously spraying the carcasses with hot water to wash the hair and refuse therefrom and from the machine.

Other and further important objects of this invention will be apparent from the disclosures in the specification and drawings.

The invention (in a preferred form) is illustrated in the drawings and hereinafter more fully described.

On the drawings:

Figure 1 is a side elevation of a machine embodying my invention.

Fig. 2 is an enlarged side elevation with part of the housing removed and parts in section.

Fig. 3 is a view taken at the discharge end of the machine looking toward the front.

Fig. 4 is an enlarged fragmentary transverse section of the machine, showing the scraping mechanism acting through the support and conveyer.

Fig. 5 is a fragmentary top plan view of the scraping mechanism with the conveying members in section.

Fig. 6 is an enlarged sectional detail of the supporting bars or grids.

As shown in the drawings:

A suitable frame is provided, consisting of uprights 1, 2, 3 and cross sills 4—5. A scalding vat 6, is provided into which the lower end of the support extends. Said support is constructed of a plurality of bars 7, of metal, arranged in pairs and spaced a suitable distance apart by means of sleeves 8, through which and the bars, bolts 9, extend to bind the same together. The pairs of bars forming the platform are spaced a suitable distance apart to permit the beaters acting upwardly therebetween and at their upper ends are supported on the bottom wall 10, of the housing, and at their lower ends are supported on the bottom wall 11. As shown in Fig. 1, the bars extend into the vat, and are directed substantially horizontal at their ends and rest on a supporting block 12.

Journaled in suitable bearings on the scalding vat 6, and frame, are shafts 13—14, on which are secured sprocket wheels 15—16, about which are trained sprocket chains 17—18, to which are rigidly secured angle irons 19. As shown in Fig. 4, the upper run of the chain runs on angle iron tracks 20, and the lower lap of the chains run in channel iron tracks 21.

Rigidly secured to the transverse bars, lags or angle irons 19, are a plurality of pushing blades or members 22, which travel in the space provided between each pair of platform bars 7, as shown clearly in Fig. 4. Suitable tension devices 17$^a$—17$^b$, are provided for maintaining the tension of the conveyer chains. Journaled in the frame beneath the supporting platform are a plurality of scraping shafts 23, 24, 25, 26 and 27, on each of which are secured drums 28, to which are secured flexible arms 29, of belting or other suitable material on the outer ends of which are secured scraping blades 30. The scraping arms are of such width as to fit between the pairs of platform bars 7, as shown clearly in Figs. 4 and 5.

Each of said scraping shafts 23 to 27, inclusive, have a sprocket wheel 31, thereon, and idler sprockets 32, 33 and 34, are provided, of which the idler sprockets 32 and 33, are journaled to the frame between the respective pairs of scraping shafts 24—25, and 26—27. A sprocket chain 35, is trained around said sprocket wheels and a suitable automatic tension device is provided for tightening the chain which comprises a sprocket wheel 36, and weight 37, movable in suitable guides or ways 38. Secured on the shaft 23, is a loose and a tight pulley 39—40, to receive a driving belt from any suitable drive shaft.

Positioned beneath the scrapers and below the converging walls 10—11, is a water tank 41. Converging walls 42—43, are also provided, which, together with the walls 10—11, provide a restricted opening beneath which is journaled a hair and refuse conveyer. Said conveyer comprises shafts 44—45, journaled to the tank on which are secured friction rollers or sprockets 46—47, and a suitable conveyer 48, is trained therearound and conveys the hair and refuse to one side of the machine. Said conveyer is operated from the shaft 23, by means of a sprocket chain 49, trained around pulleys 50—51, secured on shaft 23, and a stud shaft 52, and a pinion 53, on said shaft 52, meshes with a gear 54, on the shaft 45.

For the purpose of driving the conveyer slowly, a drive shaft 55, is journaled in the top of the frame, provided with a tight and loose pulley 56—57, on one end, and a pinion 58, on its opposite end which meshes with a large gear 59, on a shaft 60, also journaled to the frame. A small sprocket wheel 61, is secured on shaft 60, and a sprocket chain 62 is trained therearound and around a sprocket wheel 63, on conveyer shaft 14.

For the purpose of spraying and washing the carcasses, a pump 64, communicates with the tank 41, and communicates with suitable pipes 65, by means of a pipe 66. Spray pipes or heads 67, are secured to the pipes 65, and project through the upper partition or wall 68, into position to deliver a spray or shower of water continuously upon the carcasses. For the purpose of driving the pump, a belt 69, is trained around friction pulleys 70, on shaft 23, and friction pulley 71, on pump shaft 72.

The operation is as follows:

The carcasses are delivered into the scalding vat 6, and when properly treated are pushed onto the horizontal extension of the stationary platform or support 7, from whence they are elevated and advanced by the pushing members or blades 22, over the scraping mechanism. As the carcasses are being advanced, the scrapers are acting thereon through the support and conveyer blades to thoroughly dehair, clean and polish the carcasses, and at the same time the spraying mechanism is delivering a spray to wash the hair and refuse from the carcasses and scraping mechanism onto the conveyer 48, which conveys the hair and refuse outside of the machine and deposits the same into a pile for further removal. Inasmuch as the carcasses are supported and operated upon from below, it is obvious that all parts of the carcasses are equidistant from the scrapers, that is, the snout and face and all other parts, owing to the gravity of the carcasses, is in the same plane with the body and the scrapers acting upwardly through the support and conveyer on the carcasses against the gravity of the carcasses, thoroughly cleanses all parts of the carcasses uniformly and efficiently. Also, the scraping mechanism serves to continuously rotate the carcasses while scraping the same, thereby presenting all parts of the carcass to the scraping action to thoroughly dehair and clean the same.

I am aware that many changes in the construction may be made and details may be varied through a wide range, and I therefore do not desire to limit myself otherwise than necessitated by the prior art.

I claim as my invention:

1. In a machine of the class specified, stationary means for supporting carcasses, scraping mechanism acting therethrough against the gravity of the carcasses to dehair the carcasses, and means for advancing the carcasses past the scraping mechanism.

2. In a device of the class described, a stationary platform having openings therethrough, scraping mechanism acting through said openings on carcasses loosely supported on said platform, and means for advancing said carcasses.

3. In a device of the class described, a stationary platform having openings therethrough, scraping mechanism acting through said operings on carcasses loosely supported on said platform, and means for advancing the carcasses, the scraping mechanism operating through said advancing means.

4. In a machine of the class described, a stationary slotted support, rotary scraping mechanism acting upwardly through the slotted support on carcasses supported thereon, means for advancing the carcasses over the support, means beneath the scrapers for conveying hair and refuse from the machine, and means above the scrapers for spraying water upon the carcasses.

5. In a machine of the class described, an inclined grid support having the lower end directed substantially horizontal, rotating shafts, scrapers thereon opening upwardly through the grid support, and a conveyer having depending pushing members adapted to push carcasses on the grid support and advance them over the support.

6. In a device of the class described, a plurality of stationary spaced supporting members, mechanism for pushing the carcass over said supporting members, and a scraping mechanism beneath the carcass acting upwardly thereon through said spaced supporting members to clean said carcass.

7. In a device of the class described, a fixed support, a conveyer for advancing carcasses thereover, and a plurality of scraping mechanisms adapted to act through said support and conveyer on the carcasses.

8. A carcass dehairing machine comprising a stationary inclined carcass support, and flexible beaters acting through the inclined portion of said support on carcasses conveyed thereover.

9. A carcass dehairing machine comprising a stationary carcass support, a conveyer above said support, members thereon for carrying carcasses over said support, and beaters acting through the support to dehair the carcasses.

10. A carcass cleaning machine embracing an inclined stationary carcass support, and beaters acting therethrough for dehairing carcasses as they are conveyed upwardly over said inclined support.

In testimony whereof I have hereunto subscribed my name in the presence of two subscribing witnesses.

ARTHUR E. OZOUF.

Witnesses:
LAWRENCE REIBSTEIN,
EARL M. HARDINE.